United States Patent
Smith et al.

(10) Patent No.: US 11,606,304 B2
(45) Date of Patent: Mar. 14, 2023

(54) SESSIONIZATION OF NETWORK FLOWS IN A WIRELESS COMMUNICATION NETWORK

(71) Applicant: T-Mobile USA, Inc., Bellevue, WA (US)

(72) Inventors: Jeffery A. Smith, Bothell, WA (US); Arundhati Ghosh, Redmond, WA (US); Kelly Schiller, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 223 days.

(21) Appl. No.: 16/943,860

(22) Filed: Jul. 30, 2020

(65) Prior Publication Data
US 2022/0038380 A1 Feb. 3, 2022

(51) Int. Cl.
*H04L 47/2483* (2022.01)
*H04L 45/00* (2022.01)
*H04W 48/18* (2009.01)
*H04L 47/2441* (2022.01)
*H04W 76/15* (2018.01)
*H04L 45/24* (2022.01)

(52) U.S. Cl.
CPC ........ *H04L 47/2483* (2013.01); *H04L 45/24* (2013.01); *H04L 45/38* (2013.01); *H04L 47/2441* (2013.01); *H04W 48/18* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 8,184,548 B1* | 5/2012 | Croak | G06Q 30/0641 705/26.1 |
| 11,191,026 B1* | 11/2021 | Jia | H04W 76/28 |
| 11,263,640 B2* | 3/2022 | Harris | G06Q 30/016 |
| 2007/0016666 A1* | 1/2007 | Duffield | H04L 43/022 709/223 |
| 2009/0063315 A1* | 3/2009 | Cai | H04L 12/1439 705/418 |
| 2014/0075016 A1* | 3/2014 | Chatterjee | H04L 41/0686 709/224 |
| 2016/0232538 A1* | 8/2016 | Papakostas | G06F 16/285 |
| 2017/0034761 A1* | 2/2017 | Narayanan | H04L 45/74 |
| 2017/0063921 A1* | 3/2017 | Fridman | H04L 63/1466 |
| 2017/0148264 A1* | 5/2017 | Pichette | G06Q 20/123 |

(Continued)

*Primary Examiner* — Mariela Vidal Carpio
(74) *Attorney, Agent, or Firm* — Lee & Hayes, P.C.

(57) ABSTRACT

Systems and methods discussed herein are directed to combining multiple network flows with respect to usage of applications into sessions. A record of a plurality of network flows may be obtained where the record relates to usage of the application by a user device in a wireless communication network. The plurality of network flows may be combined into a session, where an earliest start time of a network flow represents a session start time for the session and a latest end time of a network flow represents a session end time for the session. Based at least in part on the session start time and the session end time, a usage of the application during the session by the user device may be determined. Based at least in part on a plurality of sessions, usage of the application in the wireless communication network may be estimated.

20 Claims, 5 Drawing Sheets

(56) References Cited

U.S. PATENT DOCUMENTS

| | | | |
|---|---|---|---|
| 2017/0237777 A1* | 8/2017 | Joch | H04L 63/1408 |
| | | | 713/152 |
| 2018/0063334 A1* | 3/2018 | Nanjundan | H04L 12/14 |
| 2018/0212818 A1* | 7/2018 | Ide | H04L 41/147 |
| 2019/0207860 A1* | 7/2019 | York | H04L 43/026 |
| 2021/0120439 A1* | 4/2021 | Suba | H04W 64/006 |

* cited by examiner

Fig. 4

SESSIONIZATION OF NETWORK FLOWS IN A WIRELESS COMMUNICATION NETWORK

BACKGROUND

Electronic devices are increasingly used to execute various applications (apps), for example, games, accessing Internet websites, location services, music, video, etc. Examples of such electronic devices include, for example, mobile communication devices such as, for example, smart phones, portable computers, notebooks, laptops, etc., and other types of computing devices, both mobile and stationary.

When electronic devices utilize apps via a network, e.g., a wireless communication network, multiple network flows may occur substantially simultaneously during execution of the apps. For example, an electronic device may utilize an app to play a game. When the app is executed, a first network flow may traverse through the network through various nodes, e.g., servers. A second network flow may occur within the network that traverses one or more different nodes with respect to the first network flow. For example, the first network flow may relate to video, while the second network flow may relate to audio. Other network flows may also occur with respect to execution of the apps.

Event data/detail records (EDRs) constitute records of network flows and may be captured at a public data network (PDN) gateway (PGW) for understanding network behavior and to generate insights with respect to usage of apps within a wireless communication network. However, the EDRs contain the multiple network traffic flows that extend over the same time period while a user is executing an app. When the multiple network traffic flows are summed with respect to the duration of all of the network traffic flows, the amount of time actually spent using the app is greatly overestimated or exaggerated. Thus, if the user behavior for an app is analyzed based on the summed network traffic flows of the EDRs, it is not possible to accurately reflect how much time, data, etc., is spent using the app. It is desirable to obtain accurate engagement metrics with respect to usage of apps within the wireless communication network since such engagement metrics may be used to monitor how closely a content strategy aligns with user behavior.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for combining multiple network flows with respect to usage of applications (apps) into sessions. In particular, a record of a plurality of network flows may be obtained where the record relates to usage of the application by a user device in a wireless communication network. A first start time for a first network flow of the plurality of network flows may be determined, where the first start time represents an earliest start time for the plurality of network flows. A first end time for a second network flow of the plurality of network flows may be determined, where the first end time represents a latest start time for the plurality of network flows. The plurality of network flows may be combined into a session, where the first start time represents a session start time for the session and the first end time represents a session end time for the session. Based at least in part on the session start time and the session end time, a usage of the application during the session by the user device may be determined. Based at least in part on a plurality of sessions, usage of the application in the wireless communication network may be estimated to provide an estimated usage of the application in the wireless communication network.

In configurations, the first network flow and the second network flow are different network flows. The second network flow may have a second start time that is different from the first start time and the first network flow may have a second end time different from the first end time. In configurations, the estimated usage may be related to at least one of a time of day, one or more days of a week, one or more dates in a month, or a season. Additionally, in configurations, based at least in part on the estimated usage, a deal may be offered to users of the wireless communication network relating to usage of the application in the wireless communication network.

In particular, in configurations, an electronic device in the form of user equipment (UE) may include an app. When the app is executed within a network, for example, a wireless communication network, three network flows may occur. A first network flow may flow from the UE through a first node to an ultimate node, e.g., access to an Internet website. A second network flow may occur from the UE through a second node to the ultimate node. A third network flow may occur from the UE through a third node to a node within the wireless network. In configurations, the third network flow may continue from the third node to the ultimate node or may terminate at the third node. For example, the third node of the network may relate to billing purposes, data usage monitoring, etc. Additionally, one or more of the network flows may flow through multiple nodes.

In configurations, a public data network (PDN) gateway (PGW) of the wireless communication network may monitor the network flows and gather data relating to the network flows. The data may include start times and end times. The PGW may gather the data as event data/detail records (EDRs) and may compile the EDRs into a central repository or repositories. Additionally, in configurations, probes within the wireless communication network may be utilized to gather data related to the network flows within the wireless communication network. The probes may gather the data, e.g., the start times and the end times for each network flow and compile them into the central repository or repositories.

In configurations, a model, e.g., a machine learning model, or an algorithm, may analyze the gathered data to determine usage relating to the usage of the app. For example, based on the start times for the network flows, the network flows may be combined into a session rather than analyzed individually. Thus, the start times for the network flows may be compared to determine an earliest start time for the network flows relating to the usage of the app. Likewise, the end times for the network flows may be analyzed to determine a final or latest end time for the network flows. With respect to usage of apps, and the various network flows, some network flows may have different start times. For example, if the app relates to viewing a video via the ultimate end node, the user may initially begin a network flow where the video is viewed in a first resolution, e.g., 480p. After an amount of time, the user may decide to view the video in a different resolution, e.g., a higher resolution of 1080p. Thus, the first network flow may end at a first time and then the second network flow may begin at a start time different than a start time of the first network flow. These two network flows are part of a same session but have different end and start times. Accordingly, in configurations, when a first network flow begins and then ends, a threshold for an amount of time between the starting of another network flow may be utilized to identify a second network flow as being related to the first network flow and thus should be included within the same session. For example, the threshold may be one second, five seconds, 30 seconds, etc.

Once the various network flows relating to usage of apps have been analyzed and combined into sessions, the sessions may be analyzed in order to determine user engagement with respect to the app within the wireless communication network. The user engagement may be based on time, data usage, etc. Likewise, the engagement may be further analyzed based upon the time of day, one or more specific days of the week, one or more dates in a month, a season, etc. Based upon the analysis of the user engagement, an operator of the wireless communication network may offer special promotions or deals to users of the wireless communication network with respect to the app and/or data usage within the wireless communication network.

Figure 1A:
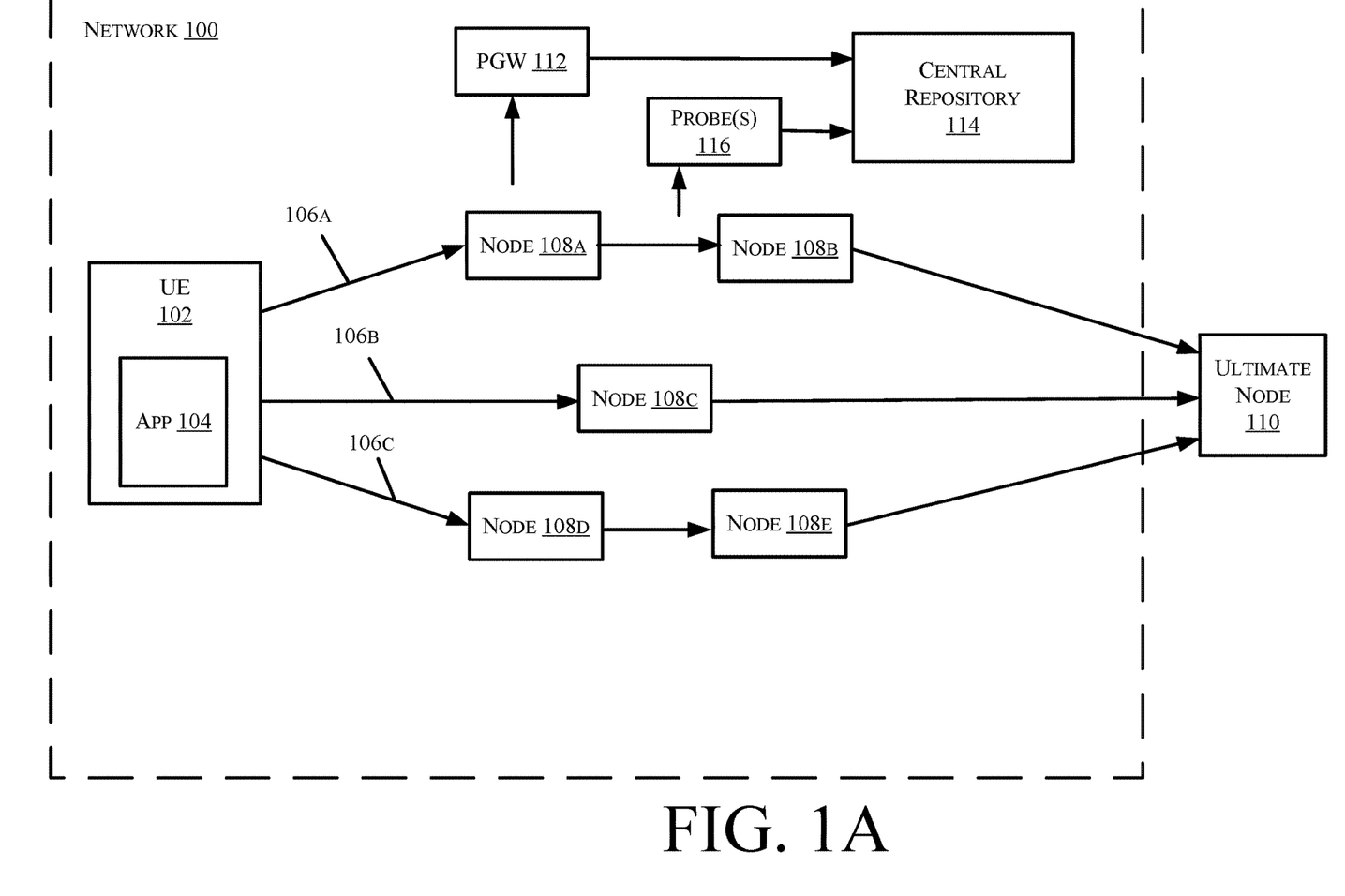
FIGS. 1A and 1B schematically illustrate an example of a portion of a network configured as a wireless communication network, in accordance with various configurations.

FIG. 1A schematically illustrates an example of a network 100. In the example of FIG. 1A, the network 100 is a wireless communication network. However, in configurations, the network 100 may be configured as another type of network and the example of FIG. 1A is not meant to be limiting. The network 100 includes a user equipment (UE) 102 configured for operation in the network 100. The UE 102 includes one or more apps 102. Generally, the network 100 includes numerous UEs 102 but only the UE 102 is illustrated for clarity purposes.

The network 100 and the UE 102 may be configured to operate according to according to one or more operating protocols, e.g., Long Term Evolution (LTE), 5G, Global System for Mobile Communications (GSM), Time Division Multiple Access (TDMA), Universal Mobile Telecommunications System (UMTS), Evolution-Data Optimized (EVDO), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

The UE 102 may be implemented as any suitable device such as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the UE 102 as being "mobile" (i.e., configured to be carried and moved around), it is to be appreciated that the UE 102 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UE 102 may be capable of communicating over wired networks, and/or wirelessly using any suitable wireless communications/data technology, protocol, or standard, such as those mentioned above.

In configurations, when the app 104 is executed within the network 100 multiple network flows 106 may occur. For example, a first network flow 106a may flow from the UE 102 through a first node 108a and a second node 108b to an ultimate node 110, e.g., to access to an Internet website. A second network flow 106b may occur from the UE 102 through a third node 108c to the ultimate node 110. A third network flow 106c may occur from the UE 102 through a fourth node 108d to a fifth node 108e within the network 100. In configurations, the third network flow 106c may continue from the fifth node 108e to the ultimate node 110 or may terminate at the fifth node 108e. For example, the fifth node 108e of the network 100 may relate to billing purposes, data usage monitoring, etc. More or fewer network flows 106 may occur and more or fewer nodes 108 may be involved depending on the app 104. In configurations, each node 108 may represent one or more servers. Also, in configurations, the ultimate node 110 may be part of the network 100.

In configurations, a public data network (PDN) gateway (PGW) 112 of the network 100 (e.g., the network 100 is configured as a wireless communication network) may monitor the network flows 106 and gather data relating to the network flows 106. The data may include start times and end times for the network flows 106. The PGW 112 may gather the data as event data/detail records (EDRs) and may compile the EDRs into a central repository or repositories 114. Additionally, in configurations, probes 116 within the network 100 may be utilized to gather data related to the network flows 106 within the network 100. The probes 116 may, alternatively or additionally, gather the data, e.g., the start times and the end times for each network flow 106 and compile them into the central repository or repositories 116.

In configurations, a model, e.g., a machine learning model, or an algorithm, may analyze the gathered data to determine usage relating to the app 104. For example, based on the start times for the network flows 106, the network flows may be combined into a session rather than analyzed individually. Thus, the start times for the network flows 106 may be compared to determine an earliest start time for the network flows 106 relating to the usage of the app 104. Likewise, the end times for the network flows 106 may be analyzed to determine a final or latest end time for the network flows 106.

Figure 1B:
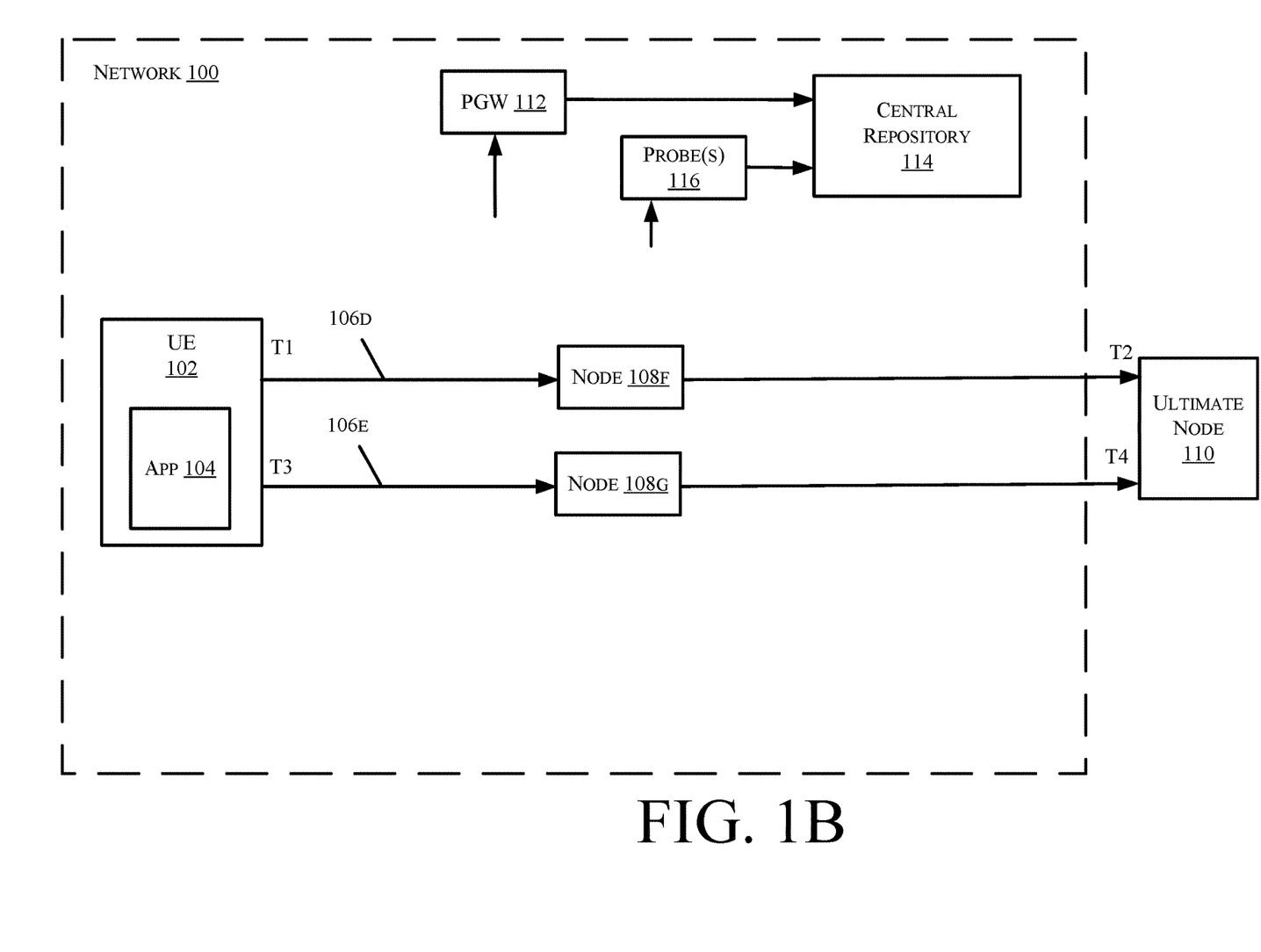

Referring to FIG. 1B, with respect to usage of the app 104, and the various network flows 106, some network flows 106 may have different start and end times. For example, if the app 104 relates to viewing a video via the ultimate end node 110, a user may initially begin a network flow, e.g., network flow 106*d* through node 108*f*, at a first start time T1 where the video is viewed in a first resolution, e.g., 480p. After an amount of time, the user may decide to view the video in a different resolution, e.g., a higher resolution of 1080p. Thus, the network flow 106*d* may end at a first end time T2 and then another network flow, e.g., network flow 106*e* through node 108*g*, may begin at a second start time T3 different than the first start time T1 of the network flow 106*b* and end at second end time T4, different than the first end time T2. These two network flows are part of the same session but have different start and end times. Accordingly, in configurations, when a first network flow 106 begins and then ends, a threshold for an amount of time between the starting of another network flow may be utilized to identify a second network flow as being related to the first network flow and thus should be included within the same session. For example, the threshold may be one second, five seconds, 30 seconds, etc. Thus, the model or algorithm analyzing gathered data for network flows 106 may evaluate end time T2 and start time T3 with respect to execution of app 104 and see that they are within the threshold of time and thus determine that network flow 106*d* and network flow 106*e* should be part of the same session.

In configurations, two or more network flows 106 may have the same start times and/or the same end times. For example, network flows 106*a* and a fifth network flow 106*e* may have the same start times T5 and the same end time T6. Additionally, one single network flow 106 may have both the earliest start time and the latest end time for a session. The model or algorithm analyzing gathered data for network flows 106 may evaluate all the end times and start times with respect to execution of app 104 within a session to determine a start time for the session and an end time for the session based on an earliest start of network flows within the session and a latest end time of network flows within the session.

Once the various network flows 106 relating to usage of apps have been analyzed and combined into sessions, the sessions may be analyzed in order to determine user engagement with respect to a particular app, e.g., app 104, within the network 100. The user engagement may relate to multiple users using their UEs 102 to execute app 104 and may be based on time, data usage, etc. Likewise, the engagement may be further analyzed based upon the time of day, one or more specific days of the week, one or more dates in a month, a season, etc. Based upon the analysis of the user engagement, an operator of the network 100 may offer special promotions or deals to users of the network 100 with respect to the app 104, e.g., a game, and/or data usage within the network 100.

Thus, in configurations, a plurality of sessions relating to usage of an app by a plurality of UEs in the network 100 may be determined. Each session may be determined by obtaining a record of a plurality of network flows 106, where the record relates to usage of the app, e.g., app 104, by a UE, e.g., UE 102, in the network 100. A first start time for a first network flow 106 of the plurality of network flows 106 may be determined, where the first start time represents an earliest start time for the plurality of network flows 106. A first end time for a second network flow 106 of the plurality of network flows 106 may be determined, where the first end time represents a latest start time for the plurality of network flows 106. The plurality of network flows 106 may be combined into a session, where the first start time represents a session start time for the session and the first end time represents a session end time for the session. Based at least in part on the session start time and the session end time, a usage of the app during the session by the UE may be determined. Based at least in part on a plurality of sessions, usage of the app in the network 100 may be estimated to provide an estimated usage of the app in the network 100.

Figure 2:
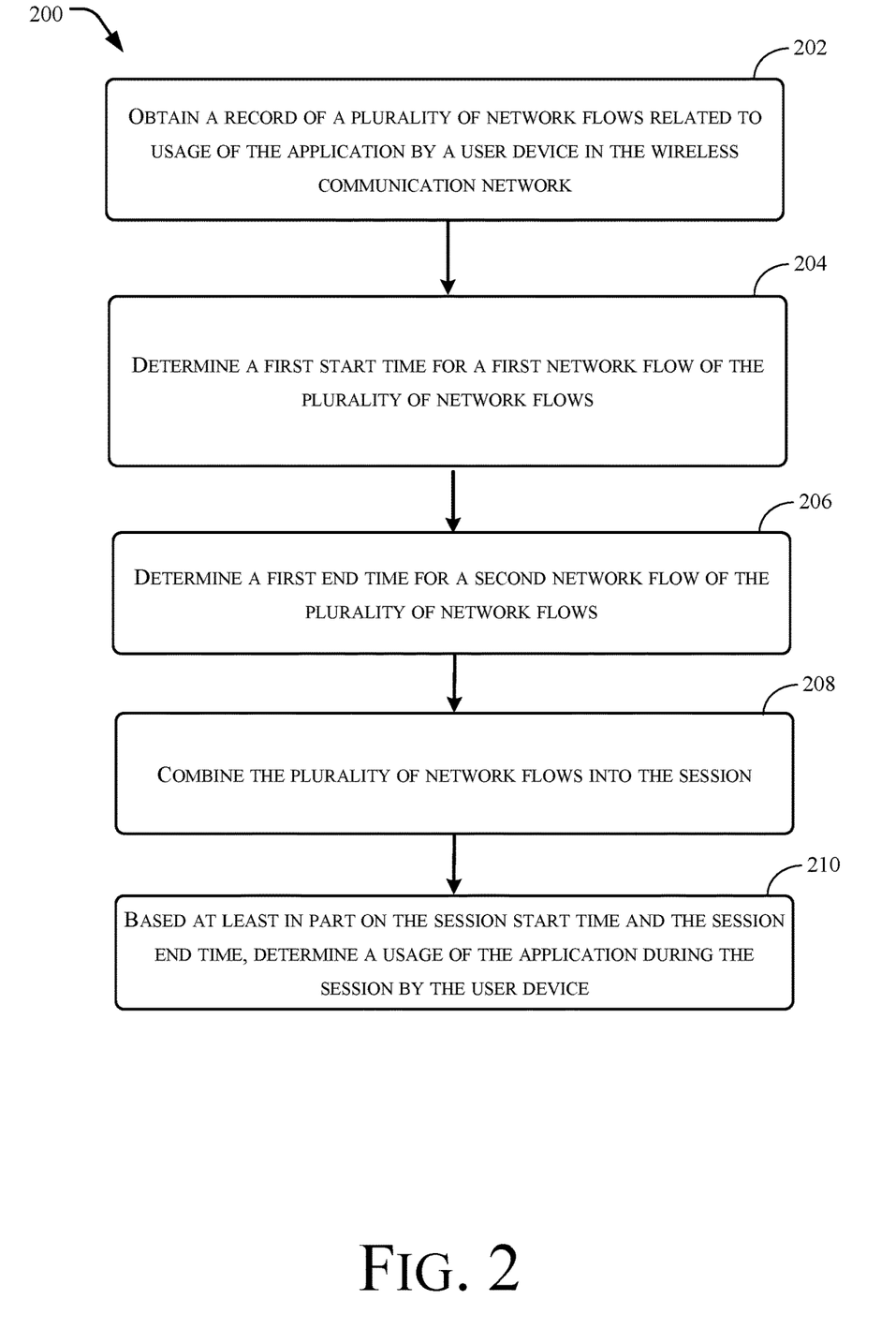
FIG. 2 is a flow diagram of an example process for determining a session of network flows of a plurality of sessions, where the plurality of sessions is used for estimating usage of an application in the network of FIGS. 1A and 1B to provide an estimated usage of the application in the network of FIGS. 1A and 1B, in accordance with various configurations.

FIG. 2 is a flow diagram of an illustrative process that may be implemented within or in association with the network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram of an example process 200 for determining a session of network flows, e.g., network flows 106, of a plurality of sessions, where the plurality of sessions is used for estimating usage of an application, e.g., app 104, in a wireless communication network, e.g., network 100, to provide an estimated usage of the application in the wireless communication network. At block 202, a record of a plurality of network flows related to usage of the application by a user device in the wireless communication network is obtained. At block 204, a first start time for a first network flow of the plurality of network flows is determined. The first start time represents an earliest start time for the plurality of network flows.

At block 206, a first end time for a second network flow of the plurality of network flows is determined. The first end time represents a latest start time for the plurality of network flows. At block 208, the plurality of network flows is combined into the session. The first start time is a session start time for the session and the first end time is a session end time for the session. At block 210, based at least in part on the session start time and the session end time, a usage of the application during the session by the user device is determined.

Figure 3:
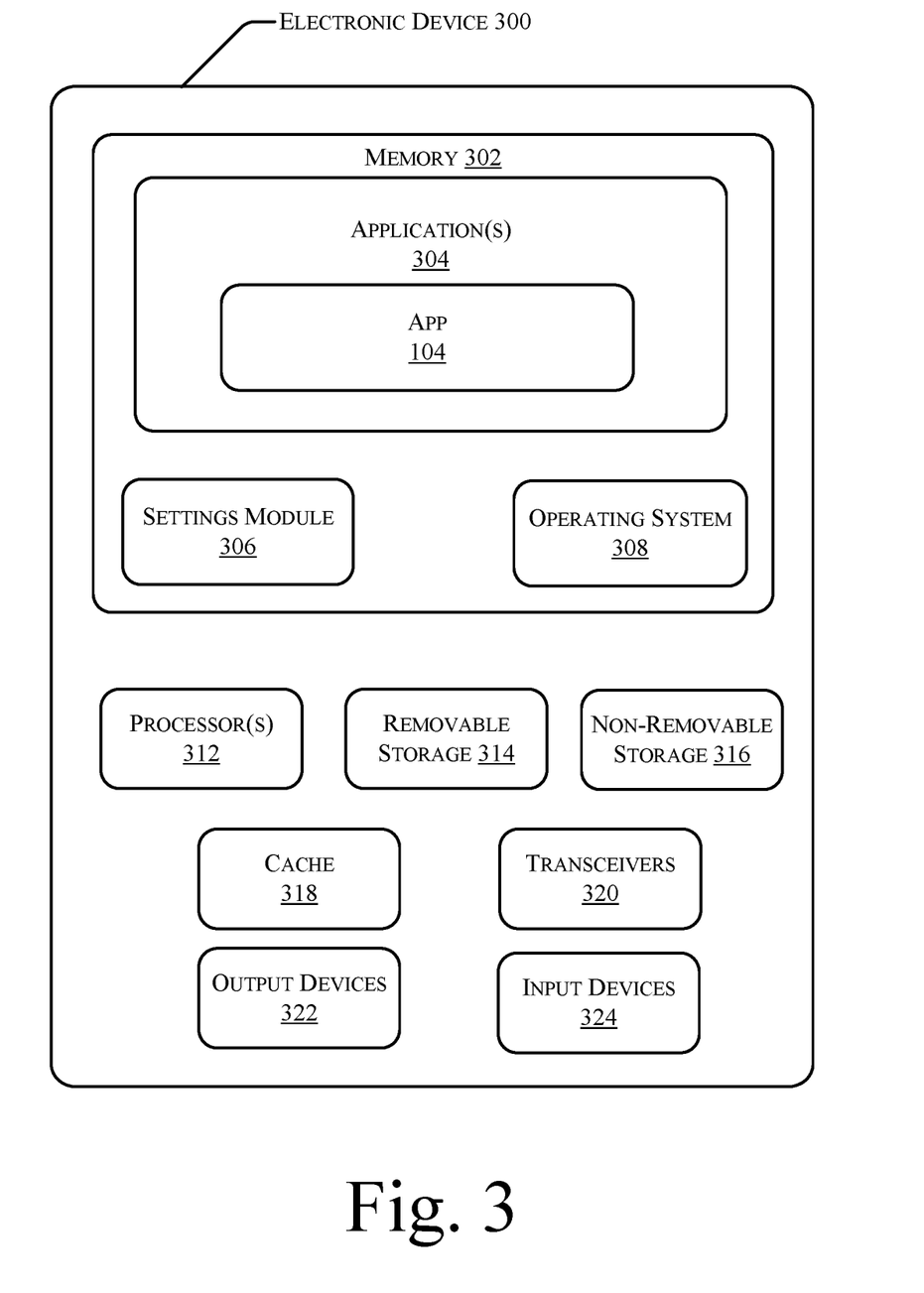
FIG. 3 schematically illustrates a component level view of an example electronic device configured for use in the network of FIGS. 1A and 1B, in accordance with various configurations.

FIG. 3 schematically illustrates a component level view of an example electronic device 300, such as UE 110, configured to function within network 100. The electronic device 300 may include more or less components depending on the type of electronic device. As illustrated, the electronic device 300 comprises a system memory 302, e.g., computer-readable media, storing application(s) 304. For example, the system memory 302 may include app 104, in addition other apps. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A, 1B and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
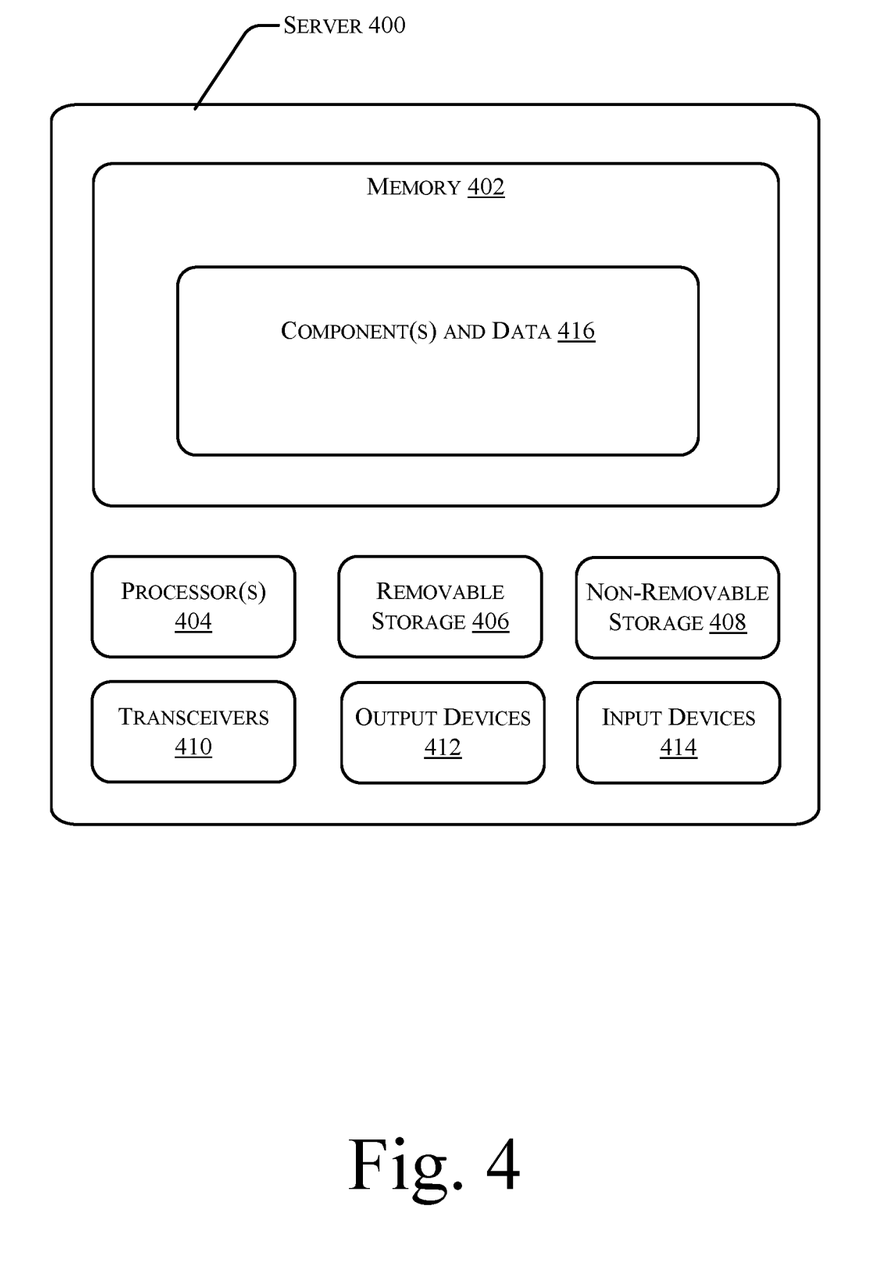
FIG. 4 schematically illustrates a component level view of a server configured for use in the network of FIGS. 1A and 1B to provide various services of the network of FIG. 1, in accordance with various configurations.

FIG. 4 illustrates a component level view of a server 400 configured for use within a network, e.g., network 100, in order to provide various services within the network, according to the techniques described herein. For example, one or more servers 400 may be configured to operate as a PGW, e.g., the PGW 112, while one or more servers 400 may be configured to operate as one or more nodes 108. As illustrated, the server 400 comprises a system memory 402 that may store one or more components and/or applications and data 416 for interacting with electronic devices 300, e.g., UE 102, or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
 determining a session of a plurality of sessions relating to usage of an application by users in a wireless communication network, the determining of the session of the plurality of sessions comprising:
  obtaining a record of a plurality of network flows related to usage of the application by a user device in the wireless communication network;
  determining a first start time for a first network flow of the plurality of network flows, the first start time representing an earliest start time for the plurality of network flows;
  determining a first end time for a second network flow of the plurality of network flows, the first end time representing a latest end time for the plurality of network flows;
  combining the plurality of network flows into the session, the first start time being a session start time for the session and the first end time being a session end time for the session; and
  determining, based at least in part on the session start time and the session end time, a usage of the application during the session by the user device; and
 estimating, based at least in part on the plurality of sessions, usage of the application in the wireless communication network to provide an estimated usage of the application in the wireless communication network.

2. The method of claim 1, wherein the first network flow and the second network flow are different network flows of the plurality of network flows.

3. The method of claim 2, wherein the second network flow has a second start time different from the first start time.

4. The method of claim 3, wherein the first network flow has a second end time different from the first end time.

5. The method of claim 1, wherein the first network flow has a second end time different from the first end time.

6. The method of claim 1, wherein the first network flow and the second network flow are a single network flow of the plurality of network flows.

7. The method of claim 1, wherein the estimated usage is related to at least one of (i) a time of day, (ii) one or more days of a week, (iii) one or more dates in a month, or (iv) a season.

8. The method of claim 1, wherein the estimated usage comprises one or more of (i) overall bandwidth used or (ii) length of time.

9. The method of claim 1, further comprising:
 based at least in part on the estimated usage, offering, to the users, a deal relating to usage of the application in the wireless communication network.

10. A non-transitory storage medium comprising instructions stored thereon, the instructions being executable by one or more processors to perform actions comprising:
 determining a session of a plurality of sessions relating to usage of an application by users in a wireless communication network, the determining of the session of the plurality of sessions comprising:
  obtaining a record of a plurality of network flows related to usage of the application by a user device in the wireless communication network;
  determining a first start time for a first network flow of the plurality of network flows, the first start time representing an earliest start time for the plurality of network flows;
  determining a first end time for a second network flow of the plurality of network flows, the first end time representing a latest end time for the plurality of network flows;
  combining the plurality of network flows into the session, the first start time being a session start time for the session and the first end time being a session end time for the session; and
  determining, based at least in part on the session start time and the session end time, a usage of the application during the session by the user device; and
 estimating, based at least in part on the plurality of sessions, usage of the application in the wireless communication network to provide an estimated usage of the application in the wireless communication network.

11. The non-transitory storage medium of claim 10, wherein the first network flow and the second network flow are different network flows of the plurality of network flows.

12. The non-transitory storage medium of claim 11, wherein the second network flow has a second start time different from the first start time.

13. The non-transitory storage medium of claim 12, wherein the first network flow has a second end time different from the first end time.

14. The non-transitory storage medium of claim 10, wherein the first network flow has a second end time different from the first end time.

15. The non-transitory storage medium of claim 10, wherein the first network flow and the second network flow are a single network flow of the plurality of network flows.

16. The non-transitory storage medium of claim 10, wherein the estimated usage is related to at least one of (i) a time of day, (ii) one or more days of a week, (iii) one or more dates in a month, or (iv) a season.

17. The non-transitory storage medium of claim 10, wherein the estimated usage comprises one or more of (i) overall bandwidth used or (ii) length of time.

18. The non-transitory storage medium of claim 10, further comprising:
 based at least in part on the estimated usage, offering, to the users, a deal relating to usage of the application in the wireless communication network.

19. An apparatus comprising:
 one or more processors; and
 a non-transitory storage medium comprising instructions stored thereon, the instructions being executable by the one or more processors to cause the processors to perform one or more actions comprising:
  determining a session of a plurality of sessions relating to usage of an application by users in a wireless communication network, the determining of the session of the plurality of sessions comprising:
   obtaining a record of a plurality of network flows related to usage of the application by a user device in the wireless communication network;
   determining a first start time for a first network flow of the plurality of network flows, the first start time representing an earliest start time for the plurality of network flows;
   determining a first end time for a second network flow of the plurality of network flows, the first end time representing a latest end time for the plurality of network flows;

combining the plurality of network flows into the session, the first start time being a session start time for the session and the first end time being a session end time for the session; and determining, based at least in part on the session start time and the session end time, a usage of the application during the session by the user device; and estimating, based at least in part on the plurality of sessions, usage of the application in the wireless communication network to provide an estimated usage of the application in the wireless communication network.

20. The apparatus of claim 19, wherein:

the first network flow and the second network flow are different network flows of the plurality of network flows;

the second network flow has a second start time different from the first start time; and the first network flow has a second end time different from the first end time.

* * * * *